US012793998B2

(12) United States Patent
Kiyabu et al.

(10) Patent No.: US 12,793,998 B2
(45) Date of Patent: Nov. 10, 2026

(54) REDOX FLOW BATTERY INCLUDING PARALLEL-CONNECTED SERIES CIRCUITS AND BYPASS CIRCUITS

(71) Applicant: MITSUBISHI HEAVY INDUSTRIES, LTD., Tokyo (JP)

(72) Inventors: Toshiyasu Kiyabu, Tokyo (JP); Tsuyoshi Wakasa, Tokyo (JP); Kei Moriyama, Tokyo (JP); Akio Sato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 481 days.

(21) Appl. No.: 18/561,101

(22) PCT Filed: Feb. 14, 2022

(86) PCT No.: PCT/JP2022/005547

§ 371 (c)(1),
(2) Date: Nov. 15, 2023

(87) PCT Pub. No.: WO2022/259616

PCT Pub. Date: Dec. 15, 2022

(65) Prior Publication Data

US 2024/0372123 A1 Nov. 7, 2024

(30) Foreign Application Priority Data

Jun. 7, 2021 (JP) ................................ 2021-095161

(51) Int. Cl.
*H01M 8/18* (2006.01)
*H01M 8/04186* (2016.01)
*H01M 8/2495* (2016.01)

(52) U.S. Cl.
CPC ....... *H01M 8/188* (2013.01); *H01M 8/04186* (2013.01); *H01M 8/2495* (2013.01)

(58) Field of Classification Search
CPC . H01M 8/188; H01M 8/04186; H01M 8/2495
See application file for complete search history.

(56) References Cited

FOREIGN PATENT DOCUMENTS

DE 102011122010 A1 * 6/2013 .......... H01M 8/2484
JP H09-92320 A 4/1997
(Continued)

OTHER PUBLICATIONS

DE_102011122010 English Translation (Year: 2011).*
(Continued)

*Primary Examiner* — Jimmy Vo
(74) *Attorney, Agent, or Firm* — Osha Bergman Watanabe & Burton LLP

(57) ABSTRACT

A redox flow battery includes a series circuit having two or more cell stacks electrically connected in series. Each of the two or more cell stacks includes a cell stack input terminal and a cell stack output terminal. Each of the two or more cell stacks is provided with a bypass circuit that electrically bypasses the cell stack. Each of the bypass circuits includes a bypass circuit input terminal and a bypass circuit output terminal. The redox flow battery includes an input switch that, with respect to each of the two or more cell stacks, switches between the cell stack input terminal and the bypass circuit input terminal and an output switch that, with respect to each of the two or more cell stacks, switches between the cell stack output terminal and the bypass circuit output terminal.

3 Claims, 4 Drawing Sheets

(56) References Cited

FOREIGN PATENT DOCUMENTS

| | | | | | |
|---|---|---|---|---|---|
| JP | 2931650 | B2 | | 8/1999 | |
| JP | 2011034782 | A | | 2/2011 | |
| JP | 2014-505976 | A | | 3/2014 | |
| JP | 5664776 | B2 | * | 2/2015 | ........ H01M 8/04328 |
| JP | 2015-156325 | A | | 8/2015 | |
| JP | 6195227 | B2 | * | 9/2017 | |
| WO | 2012/094674 | A2 | | 7/2012 | |
| WO | 2012/165245 | A1 | | 12/2012 | |

OTHER PUBLICATIONS

JP_5664776_B2 English Translation (Year: 2015).*
JP_6195227 English Translation (Year: 2017).*
International Search Report of PCT/JP2022/005547 dated Mar. 29, 2022.
International Preliminary Report on Patentability issued in corresponding International (PCT) Application No. PCT/JP2022/005547, mailed on Dec. 21, 2023. (12 Pages with English Translation).
European Search Report issued for corresponding European Patent Application No. 22819807.3, mailed Oct. 15, 2025 (7 pages).

* cited by examiner

REDOX FLOW BATTERY INCLUDING PARALLEL-CONNECTED SERIES CIRCUITS AND BYPASS CIRCUITS

TECHNICAL FIELD

The present disclosure relates to a redox flow battery.

The present application claims priority based on Japanese Patent Application No. 2021-095161 filed in Japan on Jun. 7, 2021, the contents of which are incorporated herein by reference.

BACKGROUND ART

A redox flow battery has been studied as a secondary battery for power storage, but it is necessary to electrically combine cells in series and in parallel in order to obtain a predetermined electric output. In this case, a problem is that a current flows along a potential gradient through an electrolyte passage in a case where the cells are electrically connected in series. This current is referred to as a shunt current. The shunt current is a current that is irrelevant to charging or discharging of the battery (a leakage current that merely flows through the electrolyte passage and does not contribute to charging and discharging of the current), and a loss is caused in view of charging and discharging efficiency of the battery.

PTL 1 discloses a redox flow battery for the purpose of reducing a shunt current. Such a redox flow battery includes a first series circuit and a second series circuit in which a plurality of cell stacks are electrically connected in series, and a first electrolyte supply and discharge line and a second electrolyte supply and discharge line for supplying and discharging an electrolyte to and from the cell stack. The first series circuit and the second series circuit are electrically connected in parallel, and the first electrolyte supply and discharge line and the second electrolyte supply and discharge line are connected in parallel.

CITATION LIST

Patent Literature

[PTL 1] Japanese Patent No. 2931650

SUMMARY OF INVENTION

Technical Problem

However, in the configuration of the related art described in PTL 1, although the shunt current can be reduced, since the other cell stacks cannot be continuously operated by electrically disconnecting any cell stack from the first series circuit or the second series circuit, the operation of all the cell stacks needs to be stopped for a long time even in the maintenance or inspection of any cell stack. In addition, since the other cell stacks cannot be continuously operated by electrically disconnecting any cell stack from the first series circuit or the second series circuit, the voltage obtained by the first series circuit or the second series circuit cannot be voluntarily adjusted.

The present disclosure has been made in view of the above-described problems, and an object thereof is to provide a redox flow battery capable of reducing a shunt current and continuously operating other cell stacks by electrically disconnecting any cell stack from a series circuit.

Solution to Problem

In order to achieve the above object, a redox flow battery according to the present disclosure is a redox flow battery that includes at least one series circuit in which at least two or more cell stacks each including at least one cell are electrically connected in series. The at least one cell is divided into a first chamber and a second chamber by a membrane, a first electrolyte circulates in the first chamber, and a second electrolyte circulates in the second chamber, a first circulation passage which includes the first chamber in the passage and through which the first electrolyte circulates and a second circulation passage which includes the second chamber in the passage and through which the second electrolyte circulates are individually provided for each of the at least two or more cell stacks, each of the at least two or more cell stacks includes a cell stack input terminal and a cell stack output terminal, a bypass circuit that electrically bypasses the cell stack is provided for each of the at least two or more cell stacks, each of the bypass circuits includes a bypass circuit input terminal and a bypass circuit output terminal, and an input switch that switches between the cell stack input terminal and the bypass circuit input terminal and an output switch that switches between the cell stack output terminal and the bypass circuit output terminal are provided for each of the at least two or more cell stacks.

Advantageous Effects of Invention

In accordance with the redox flow battery according to the present disclosure, the shunt current can be reduced, and the other cell stacks can be continuously operated by electrically disconnecting any cell stack from the series circuit.

DESCRIPTION OF EMBODIMENTS

Figure 1:
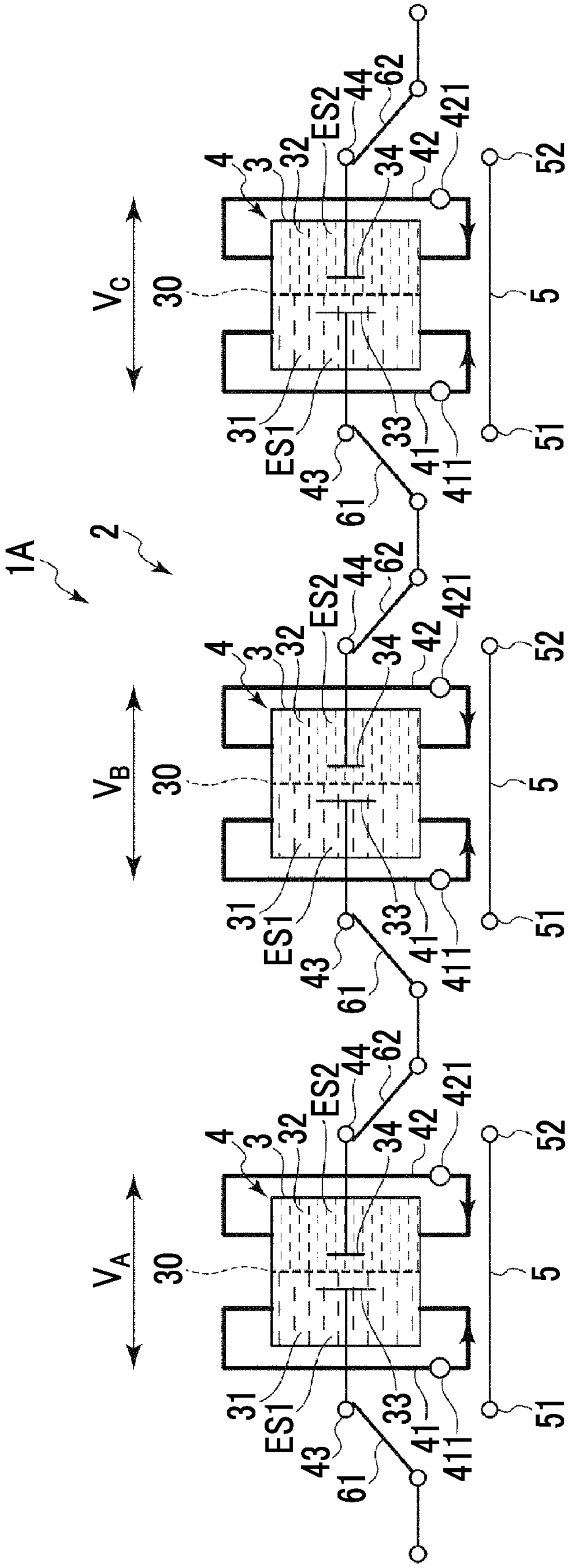
FIG. 1 is a schematic diagram illustrating a configuration example of a redox flow battery according to a first embodiment.

Hereinafter, a redox flow battery according to an embodiment will be described with reference to the accompanying drawings. Dimensions, materials, shapes, relative arrangements, and the like of components described as embodiments or illustrated in the drawings are not intended to limit the scope of the present invention, but are merely explanatory examples.

First Embodiment

FIG. 1 is a schematic diagram illustrating a configuration example of a redox flow battery 1A according to a first embodiment.

As illustrated in FIG. 1, the redox flow battery 1A according to the first embodiment is a redox flow battery including one series circuit 2 in which three cell stacks 4 each including one cell 3 are electrically connected in series. Although FIG. 1 illustrates the cell stack 4 including one cell 3, the present embodiment is not limited to the cell stack 4 including one cell 3, and the cell stack may include two or more cells 3. In addition, although FIG. 1 illustrates the series circuit 2 in which three cell stacks 4 are electrically connected in series, the present embodiment is limited to the series circuit in which three cell stacks 4 are electrically connected in series, and the series circuit may include any number of cell stacks 4 as long as these cell stacks are electrically connected in series. In addition, although one series circuit 2 is illustrated in FIG. 1, the present embodiment is not limited to one series circuit 2, and two or more series circuits 2 may be electrically connected in parallel.

The cell 3 is divided into a first chamber 31 and a second chamber 32 by a membrane 30. A first electrode 33 is disposed in the first chamber 31, a second electrode 34 is disposed in the second chamber 32, a first electrolyte ES1 circulates in the first chamber 31, and a second electrolyte ES2 circulates in the second chamber 32. The first electrode 33 is a positive electrode and the second electrode 34 is a negative electrode. A current flows from the first electrode 33 to the second electrode 34 during charging, and a current flows from the second electrode 34 to the first electrode 33 during discharging. Accordingly, the first electrode 33 serves as an anode, the second electrode 34 serves as a cathode during charging, the first electrode 33 serves as a cathode, and the second electrode 34 serves as an anode during discharging. The first electrolyte ES1 is a positive electrode electrolyte, and is obtained by dissolving an active material in an aqueous solution containing a supporting electrolyte. For example, an acidic aqueous solution obtained by dissolving sulfuric acid in an aqueous solution containing a supporting electrolyte is used, and a vanadium ion ($VO_2^+$ ($VO^{2+}$)) is used for the active material. The second electrolyte ES2 is a negative electrode electrolyte, and is obtained by dissolving an active material in an aqueous solution containing a supporting electrolyte similarly to the first electrolyte ES1. For example, an acidic aqueous solution obtained by dissolving sulfuric acid in an aqueous solution containing a supporting electrolyte is used, and a vanadium ion ($V^{2+}$($V^{3+}$)) is used for the active material.

In the redox flow battery 1A according to the first embodiment, a first circulation passage 41 and a second circulation passage 42 are individually provided for one cell stack 4. Accordingly, the first circulation passage 41 and the second circulation passage 42 are provided for each of the three cell stacks, and a total of three first circulation passages 41 and a second circulation passage 42 are provided. The first circulation passage 41 is a passage which includes the first chamber 31 in the passage and through which the first electrolyte ES1 circulates, and the second circulation passage 42 is a passage which includes the second chamber 32 in the passage and through which the second electrolyte ES2 circulates. The first circulation passage 41 and the second circulation passage 42 are formed as circulation passages through which the first electrolyte ES1 and the second electrolyte ES2 circulate, respectively, and the first electrolyte ES1 and the second electrolyte ES2 circulate through the first circulation passage 41 and the second circulation passage 42 by circulation devices 411 and 421 provided in the passages, respectively. Although the details of the circulation devices 411 and 421 are not illustrated, similarly to a known redox flow battery, the circulation device includes a tank for storing the electrolyte and a pump for circulating the electrolyte.

In addition, each cell stack 4 includes a cell stack input terminal 43 and a cell stack output terminal 44. The first electrode 33 (positive electrode) described above is connected to the cell stack input terminal 43, and the second electrode 34 (negative electrode) described above is connected to the cell stack output terminal 44.

In the redox flow battery 1A according to the first embodiment, one bypass circuit 5 is provided for one cell stack 4. Accordingly, one bypass circuit is provided for each of three cell stacks 4, and a total of three bypass circuits 5 are provided. The bypass circuit 5 is a circuit that electrically bypasses the cell stack 4.

Each of the bypass circuits 5 includes a bypass circuit input terminal 51 and a bypass circuit output terminal 52. The bypass circuit input terminal 51 corresponds to the cell stack input terminal 43, and the bypass circuit output terminal 52 corresponds to the cell stack output terminal 44.

In the redox flow battery 1A according to the first embodiment, one input switch 61 and one output switch 62 are provided for one cell stack 4. Accordingly, one input switch 61 and one output switch 62 are provided for each of the three cell stacks 4, and three input switches 61 and three output switches 62 are provided in total. The input switch 61 is a switch that switches between the cell stack input terminal 43 and the bypass circuit input terminal 51, and the output switch 62 is a switch that switches between the cell stack output terminal 44 and the bypass circuit output terminal 52.

Then, in a case where the input switch 61 is switched from the cell stack input terminal 43 to the bypass circuit input terminal 51, the output switch 62 is switched from the cell stack output terminal 44 to the bypass circuit output terminal 52, and in a case where the input switch is switched from the bypass circuit input terminal 51 to the cell stack input terminal 43, the output switch is switched from the bypass circuit output terminal 52 to the cell stack output terminal 44.

Figure 2:
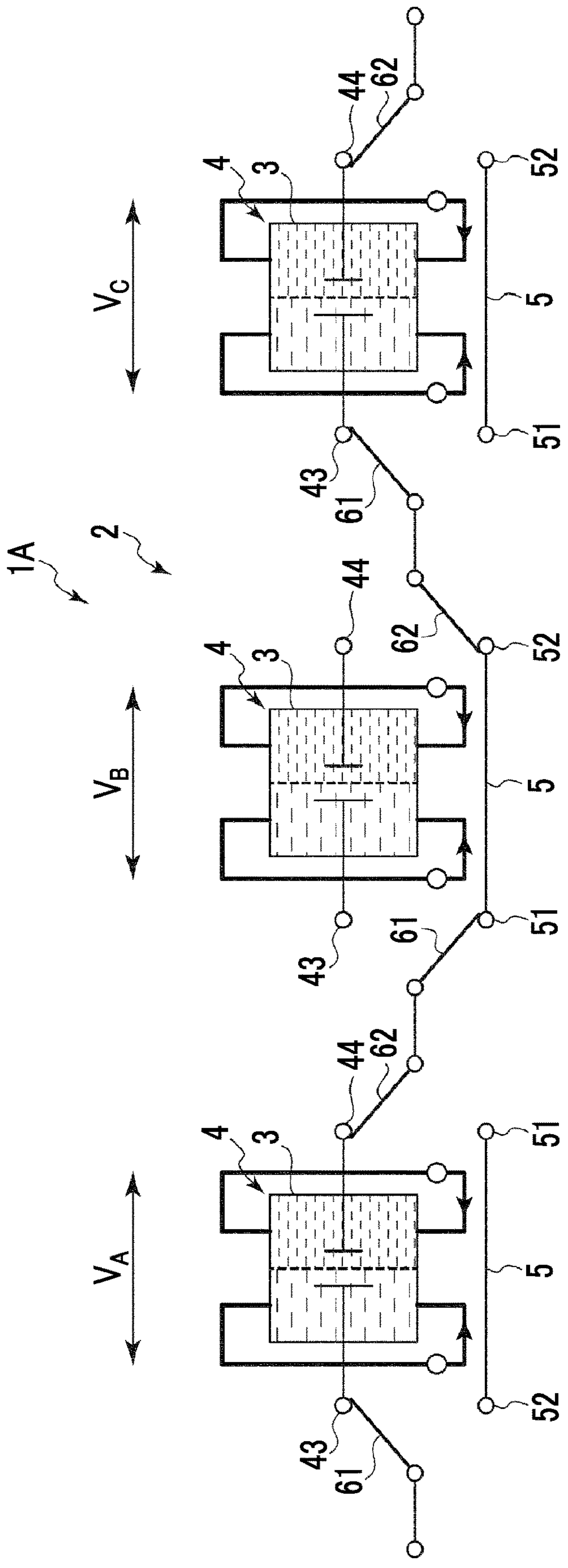
FIG. 2 is a schematic diagram illustrating a state where any cell stack is disconnected from a series circuit in the configuration example of the redox flow battery illustrated in FIG. 1.

FIG. 2 is a schematic diagram illustrating a state where any cell stack 4 is disconnected from the series circuit 2 in the configuration example of the redox flow battery 1A illustrated in FIG. 1.

As illustrated in FIG. 2, in the redox flow battery 1A according to the first embodiment, the input switch 61 and the output switch 62 provided for any cell stack 4 are switched to the bypass circuit input terminal 51 and the bypass circuit output terminal 52, and thus, the any cell stack 4 can be electrically disconnected from the series circuit 2. As a result, a series circuit passing through the bypass circuit 5 provided for the any cell stack 4 is constructed. In addition, the input switch 61 and the output switch 62 provided for the any cell stack 4 are switched to the cell stack input terminal 43 and the cell stack output terminal 44, and thus, the any cell stack can be electrically restored to the series circuit. As a result, a series circuit passing through the cell stack 4 is constructed. In the example illustrated in FIG. 2, although one cell stack 4 out of the three cell stacks 4 is electrically disconnected, the number of electrically disconnected cell stacks 4 is not limited to one, and any number of cell stacks 4 can be disconnected.

In addition, since the redox flow battery 1A according to the first embodiment can electrically disconnect any number of cell stacks 4, a voltage obtained by the series circuit 2 can be adjusted by the number of electrically disconnected cell stacks 4. For example, a voltage ($V_{total}$) obtained in the series circuit 2 by the state illustrated in FIG. 1 is $V_A+V_B+V_C$, whereas a voltage ($V_{total}$) obtained in the series circuit 2 in the state illustrated in FIG. 2 is $V_A+V_C$.

In accordance with the redox flow battery 1A according to the first embodiment, since the first circulation passage 41 and the second circulation passage 42 are individually provided for one cell stack 4, even though a potential gradient occurs in the three cell stacks 4 electrically connected in series, a shunt current passing through the first circulation passage 41 or the second circulation passage 42 and flowing along the potential gradient can be reduced.

In addition, the input switch 61 and the output switch 62 provided for the any cell stack 4 are switched to the bypass circuit input terminal 51 and the bypass circuit output terminal 52, and thus, the any cell stack 4 can be electrically disconnected from the series circuit 2. Accordingly, the other cell stacks 4 can be continuously operated. As a result, the any cell stack 4 can be repaired and inspected without stopping the operation of all the cell stacks 4 for a long time.

In addition, since any number of cell stacks 4 can be electrically disconnected from the series circuit 2, the voltage obtained by the series circuit 2 can be adjusted by the number of disconnected cell stacks 4 without using a device such as a DC/DC converter.

Second Embodiment

Figure 3:
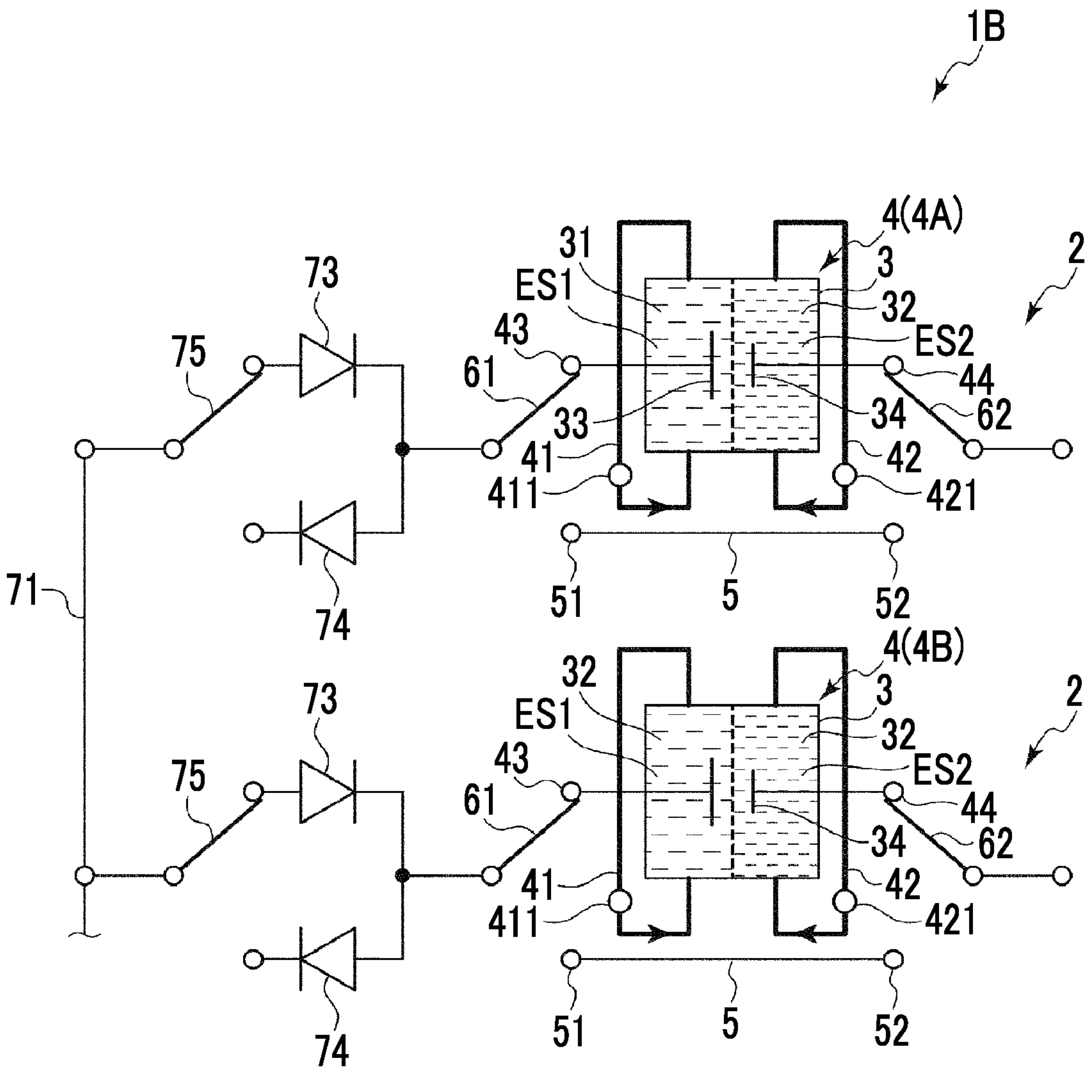
FIG. 3 is a schematic diagram illustrating a configuration example of a redox flow battery according to a second embodiment.

FIG. 3 is a schematic diagram illustrating a configuration example of a redox flow battery 1B according to a second embodiment. Note that, configurations identical to the configurations of the redox flow battery 1A according to the first embodiment described above will be assigned identical reference numerals and the description thereof will be omitted.

As illustrated in FIG. 3, the redox flow battery 1B according to the second embodiment is a redox flow battery including two series circuits 2 electrically connected in parallel. Although FIG. 3 illustrates the redox flow battery 1B including the two series circuits 2, the present embodiment is not limited to the redox flow battery including the two series circuits 2, and the redox flow battery may include any number of series circuits as long as the series circuits are electrically connected in parallel.

The redox flow battery 1B according to the second embodiment includes a connection circuit 71 that electrically connects two series circuits 2 in parallel. A first diode 73, a second diode 74, and a changeover switch 75 are provided between the connection circuit 71 and each series circuit 2. The first diode 73 and the second diode 74 are disposed in parallel, and both the diodes are connected to the input switch 61. The first diode 73 allows a current to flow only to the series circuit 2 from the connection circuit 71, and the second diode 74 allows a current to flow only to the connection circuit 71 from the series circuit 2. The changeover switch 75 is a switch that connects the connection circuit 71 to either the first diode 73 or the second diode 74.

Then, all the changeover switches 75 provided between the connection circuit 71 and the series circuits 2 are connected to the first diode 73 during charging and all the changeover switches are connected to the second diode 74 during discharging.

In the redox flow battery 1B according to the second embodiment, all the changeover switches 75 provided between the connection circuit 71 and the series circuits 2 are connected to the first diode 73 during charging, and a current flowing from the connection circuit 71 (charging current) passes through the changeover switch 75, the first diode 73, the input switch 61, and the cell stack input terminal 43 and is supplied to the cell stack 4, and is charged into the cell stack 4. Then, at this time, even though a voltage imbalance occurs between the cell stack 4 (4A) and the cell stack 4 (4B) electrically connected in parallel to the cell stack 4A, a current flows only to the series circuit 2 from the connection circuit 71 by the first diode 73, and the flow of a current to the connection circuit 71 from the series circuit 2 is regulated. Accordingly, in a case where the electricity charged in the cell stack 4A is not discharged to the cell 4B, since the electricity charged in the cell stack 4B is not discharged to the cell stack 4A, the charging and discharging between the cell stack 4A and the cell stack 4B is limited.

On the other hand, all the changeover switches 75 provided between the connection circuit 71 and the series circuits 2 are connected to the second diode 74 during discharging, and the current flowing out from the cell stack 4 passes through the input switch 61, the second diode 74, and the changeover switch 75 and is supplied to the connection circuit 71, and is discharged from the cell stack 4. Then, at this time, even though a voltage imbalance occurs between the cell stack 4 (4A) and the cell stack 4 (4B) electrically connected in parallel to the cell stack 4A, a current flows only to the connection circuit 71 from the series circuit 2 by the second diode 74, and the flow of a current to the series circuit 2 from the connection circuit 71 is regulated. Accordingly, in a case where the electricity charged in the cell stack 4A is not discharged to the cell stack 4B, since the electricity charged in the cell stack 4B is not discharged to the cell stack 4B, the charging and discharging between the cell stack 4A and the cell stack 4B is limited.

In accordance with the redox flow battery 1B according to the second embodiment, all the changeover switches 75 provided between the connection circuit 71 and the series circuits 2 are connected to the first diode 73 during charging, and thus, a current (charging current) flows only to the series circuit 2 from the connection circuit 71. As a result, the charging and discharging between two series circuits 2 electrically connected in parallel can be reduced. All the changeover switches 75 provided between the connection circuit 71 and the series circuits 2 are connected to the second diode 74 during discharge, and thus, a current (discharge current) flows only to the series circuit 2 from the connection circuit 71. As a result, the charging and discharging between two series circuits 2 electrically connected in parallel can be reduced.

Third Embodiment

Figure 4:
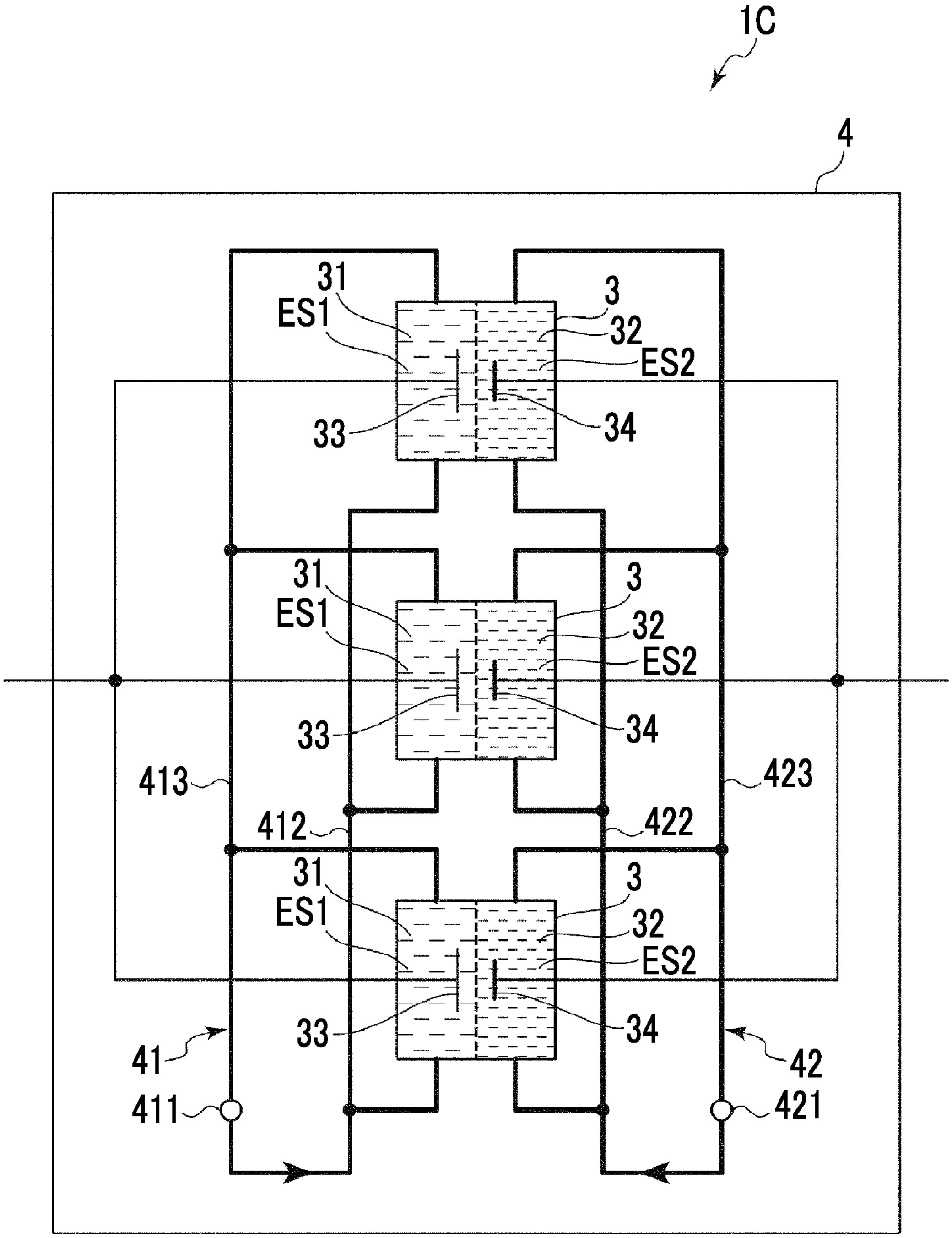
FIG. 4 is a schematic diagram illustrating a configuration example of a cell stack constituting a redox flow battery according to a third embodiment.

FIG. 4 is a schematic diagram illustrating a configuration example of a cell stack 4 constituting a redox flow battery 1C according to a third embodiment. Note that, configurations identical to the configurations of the redox flow batteries 1A and 1B according to the first and second embodiments described above are assigned identical reference numerals and the description thereof will be omitted.

As illustrated in FIG. 4, in the redox flow battery 1C according to the third embodiment, similarly to the redox flow battery 1A according to the first embodiment described above or the redox flow battery 1B according to the second embodiment described above, one cell stack 4 includes three cells 3. The three cells 3 are electrically connected in parallel. Although the drawing illustrates the cell stack 4 in which the three cells 3 are electrically connected in parallel, the present embodiment is not limited to the three cells 3, and the cell stack may include any number of cells 3 as long as the cells are electrically connected in parallel.

In the redox flow battery 1C according to the third embodiment, the first circulation passage 41 described above includes a first supply passage 412 and a first recovery passage 413. The first supply passage 412 is a passage that branches to be connected to each of the above-described cells 3 (first chambers 31), and the first recovery passage 413 is a passage that is connected to each of the above-described cells 3 (first chambers 31). In addition, the above-described second circulation passage 42 includes a second supply passage 422 and a second recovery passage 423. The second supply passage 422 is a passage that branches to be connected to each of the cells 3 (second chambers 32) described above similarly to the first supply passage 412 described above, and the second recovery passage 423 is a passage that is connected to each of the above-described cells 3 (second chambers 32).

In the redox flow battery 1C according to the third embodiment, the first electrolyte ES1 is distributed to the first chamber 31 of each of the three cells 3, and the second electrolyte ES2 is distributed to the second chamber 32 of each of the three cells 3. Then, the first electrolyte ES1 is recovered from the first chamber 31 of each of the three cells 3, and the second electrolyte ES2 is recovered from the second chamber 32 of each of the three cells 3.

In accordance with the redox flow battery 1C according to the third embodiment, since the first electrolyte ES1 and the second electrolyte ES2 are distributed to each of the three cells 3 and the first electrolyte ES1 and the second electrolyte ES2 are recovered from each of the three cells 3, a potential difference can be reduced between the three cells 3 electrically connected in parallel.

The present invention is not limited to the above-described embodiments, and includes modifications of the above-described embodiments and a combination of these embodiments as appropriate.

For example, the contents described in each of the embodiments are understood as follows.

A redox flow battery (1A) according to an aspect of [1] is a redox flow battery that includes at least one series circuit (2) in which at least two or more cell stacks (4) each including at least one cell (3) are electrically connected in series. The at least one cell (3) is divided into a first chamber (31) and a second chamber (32) by a membrane (30), a first electrolyte (ES1) circulates in the first chamber (31), and a second electrolyte (ES2) circulates in the second chamber (32), a first circulation passage (41) which includes the first chamber (31) in the passage and through which the first electrolyte (ES1) circulates and a second circulation passage (42) which includes the second chamber (32) in the passage and through which the second electrolyte (ES2) circulates are individually provided for each of the at least two or more cell stacks (4), each of the at least two or more cell stacks (4) includes a cell stack input terminal (43) and a cell stack output terminal (44), a bypass circuit (5) that electrically bypasses the cell stack (4) is provided for each of the at least two or more cell stacks (4), each of the bypass circuits (5) includes a bypass circuit input terminal (51) and a bypass circuit output terminal (52), and an input switch (61) that switches between the cell stack input terminal (43) and the bypass circuit input terminal (51) and an output switch (62) that switches between the cell stack output terminal (44) and the bypass circuit output terminal (52) are provided for each of the at least two or more cell stacks (4).

In accordance with such a configuration, since the first circulation passage (41) and the second circulation passage (42) are individually provided in each of the at least two or more cell stacks (4) electrically connected in series, even though a potential gradient occurs in the at least two or more cell stacks (4) electrically connected in series, a shunt current passing through the first circulation passage (41) or the second circulation passage (42) and flowing along the potential gradient can be reduced.

In addition, the input switch (61) and the output switch (62) provided for the any cell stack (4) are switched to the bypass circuit input terminal (51) and the bypass circuit output terminal (52), respectively, and thus, the any cell stack (4) can be electrically disconnected from the series circuit (2). Accordingly, the other cell stacks (4) can be continuously operated. As a result, the any cell stack (4) can be repaired and inspected without stopping the operation of all the cell stacks (4) for a long time.

In addition, since any number of cell stacks (4) can be electrically disconnected from the series circuit (2), the voltage obtained by the series circuit (2) can be adjusted by the number of disconnected cell stacks (4) without using a device such as a DC/DC converter.

[2] The redox flow battery (1A) according to another aspect is the redox flow battery (1A) according to [1]. The output switch (62) is switched from the cell stack output terminal (44) to the bypass circuit output terminal (52) in a case where the input switch (61) is switched from the cell stack input terminal (43) to the bypass circuit input terminal (51), and is switched from the bypass circuit output terminal (52) to the cell stack output terminal (44) in a case where the input switch is switched from the bypass circuit input terminal (51) to the cell stack input terminal (43).

In accordance with such a configuration, the cell stack (4) corresponding to the input switch (61) can be disconnected only by switching the input switch (61) from the cell stack input terminal (43) to the bypass circuit input terminal (51). In addition, the cell stack (4) corresponding to the input switch (61) can be restored only by switching the input switch (61) from the bypass circuit input terminal (51) to the cell stack input terminal (43).

[3] The redox flow battery (1B) according to still another aspect is the redox flow battery (1A) according to [1] or [2]. The at least one series circuit (2) includes at least two or more series circuits (2) in which series circuits (2) are electrically connected in parallel, a connection circuit (71) in which the at least two or more series circuits (2) are electrically connected in parallel is provided, and a first diode (73) that allows a current to flow to only the series circuit (2) from the connection circuit (71), a second diode (74) that allows a current to flow to only the connection circuit (71) from the series circuit (2), and a changeover switch (75) that connects the connection circuit (71) to either the first diode (73) or the second diode (74) are provided between the connection circuit (71) and each of the at least two or more series circuits (2).

In accordance with such a configuration, all the changeover switches (75) provided between the connection circuit (71) and at least two or more series circuits (2) are switched to the first diode (73), and thus, a current (charging current) flows only to the series circuit (2) from the connection circuit (71). As a result, the charging and discharging between the series circuits (2) electrically connected in parallel can be reduced. All the changeover switches (75) are switched to the second diode (74), and thus, the current (discharge current) flows only to the connection circuit (71) from the series circuit (2). As a result, the charging and discharging between the series circuits (2) electrically connected in parallel can be reduced.

[4] The redox flow battery (1B) according to still another aspect is the redox flow battery (1B) according to [3]. The changeover switch (75) is switched to the first diode (73) during charging and is switched to the second diode (74) during discharging.

In accordance with such a configuration, the current passes through the first diode (73) and flows through the series circuit (2) during charging, and the current passes through the second diode (74) and flows out from the series circuit (2) during discharging. As a result, during charging and discharging, the charging and discharging between the series circuits (2) electrically connected in parallel can be reduced.

[5] The redox flow battery (1C) according to still another aspect is the redox flow battery (1A or 1B) according to any one of [1] to [4]. The at least one cell (3) includes at least two or more cells (3) electrically connected in parallel. The first circulation passage (41) includes a first supply passage (412) that branches to be connected to each of the at least two or more cells (3) and a first recovery passage (413) that is connected to each of the at least two or more cells (3), and the second circulation passage (42) includes a second supply passage (422) that branches to be connected to each of the at least two or more cells (3) and a second recovery passage (423) that is connected to each of the at least two or more cells (3).

In accordance with such a configuration, since the first electrolyte (ES1) and the second electrolyte (ES2) are distributed to each of the at least two or more cells (3) and the first electrolyte (ES1) and the second electrolyte (ES2) are recovered from each of the at least two or more cells (3), the potential difference can be reduced between the two or more cells (3) electrically connected in parallel.

REFERENCE SIGNS LIST

1A, 1B, 1C redox flow battery
2 series circuit
3 cell
30 membrane
31 first chamber
32 second chamber
33 first electrode (positive electrode)
34 second electrode (negative electrode)
4 cell stack
41 first circulation passage
411 circulation device
412 first supply passage
413 first recovery passage
42 second circulation passage
421 circulation device
422 second supply passage
423 second recovery passage
43 cell stack input terminal
44 cell stack output terminal
5 bypass circuit
51 bypass circuit input terminal
52 bypass circuit output terminal
61 input switch
62 output switch
71 connection circuit
73 first diode
74 second diode
75 changeover switch
ES1 first electrolyte
ES2 second electrolyte

The invention claimed is:

1. A redox flow battery comprising:

at least one series circuit in which at least two or more cell stacks each including at least one cell are electrically connected in series, wherein the at least one cell is divided into a first chamber and a second chamber by a membrane, a first electrolyte circulates in the first chamber, and a second electrolyte circulates in the second chamber, a first circulation passage which includes the first chamber in the passage and through which the first electrolyte circulates and a second circulation passage which includes the second chamber in the passage and through which the second electrolyte circulates are individually provided for each of the at least two or more cell stacks, each of the at least two or more cell stacks includes a cell stack input terminal and a cell stack output terminal, a bypass circuit that electrically bypasses the cell stack is provided for each of the at least two or more cell stacks, each of the bypass circuits includes a bypass circuit input terminal and a bypass circuit output terminal, an input switch that switches between the cell stack input terminal and the bypass circuit input terminal and an output switch that switches between the cell stack output terminal and the bypass circuit output terminal are provided for each of the at least two or more cell stacks, the at least one series circuit includes at least two or more series circuits in which series circuits are electrically connected in parallel, a connection circuit in which the at least two or more series circuits are electrically connected in parallel is provided, and a first diode that allows a current to flow to only the series circuit from the connection circuit, a second diode that allows a current to flow to only the connection circuit from the series circuit, and a changeover switch that connects the connection circuit to either the first diode or the second diode are provided between the connection circuit and each of the at least two or more series circuits, wherein the changeover switch is switched to the first diode during charging and to the second diode during discharging to limit the charging and discharging between the at least two or more cell stacks.

2. The redox flow battery according to claim 1, wherein the output switch is switched from the cell stack output terminal to the bypass circuit output terminal in a case where the input switch is switched from the cell stack input terminal to the bypass circuit input terminal, and is switched from the bypass circuit output terminal to the cell stack output terminal in a case where the input switch is switched from the bypass circuit input terminal to the cell stack input terminal.

3. The redox flow battery according to claim 1, wherein the at least one cell includes at least two or more cells electrically connected in parallel, the first circulation passage includes a first supply passage that branches to be connected to each of the at least two or more cells and a first recovery passage that is connected to each of the at least two or more cells, and the second circulation passage includes a second supply passage that branches to be connected to each of the at least two or more cells and a second recovery passage that is connected to each of the at least two or more cells.

* * * * *